United States Patent
Stretanski

[11] 3,714,114
[45] Jan. 30, 1973

[54] MELAMINES AS LIGHT STABILIZERS IN TITANIUM DIOXIDE PIGMENTED POLYMERS

[75] Inventor: Joseph Anthony Stretanski, Clinton, N.J.

[73] Assignee: American Cyanamid Company, Stamford, Conn.

[22] Filed: March 30, 1971

[21] Appl. No.: 129,610

Related U.S. Application Data

[63] Continuation of Ser. No. 771,274, Oct. 28, 1968, abandoned.

[52] U.S. Cl. ...................260/41 B, 260/45.8 N
[51] Int. Cl. ....................C08f 45/04, C08f 45/60
[58] Field of Search ...................260/41 B, 45.8 N

[56] References Cited

UNITED STATES PATENTS 3,084,135   4/1963   Scullin .................................260/41
3,496,136   2/1970   Susi et al. ...........................260/45.8

FOREIGN PATENTS OR APPLICATIONS 637,808   3/1962   Canada ...........................260/45.75

OTHER PUBLICATIONS

Chevassus et al., The Stabilization of Polyvinyl Chloride, Edward Arnold Pub., LTD, London, 1963, p. 76–83

Primary Examiner—Allan Lieberman
Assistant Examiner—J. H. Derrington
Attorney—Philip T. Mintz

[57] ABSTRACT

A polymeric composition stable against ultraviolet light comprising (a) a polymer selected from the group consisting of poly(vinyl chloride), polystyrene and polyolefins; (b) titanium dioxide and (c) a melamine of the formula

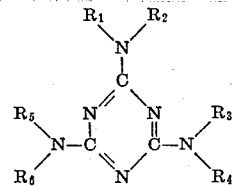

wherein $R_1$, $R_2$, $R_3$, $R_4$, $R_5$ and $R_6$ are individually selected from the group consisting of hydrogen, alkyl of one to 12 carbon atoms, alkenyl of up to three carbon atoms, hydroxyalkyl of one to six carbon atoms, monocarbocyclic aryl, and together one pair of R groups on each nitrogen atom can comprise a five or six member hetero-ring.

2 Claims, No Drawings

MELAMINES AS LIGHT STABILIZERS IN TITANIUM DIOXIDE PIGMENTED POLYMERS

This application is a continuation of application Ser. No. 771,274, filed Oct. 28, 1968, now abandoned.

This invention relates to light stabilized pigmented polymeric compositions. More particularly this invention relates to light stabilized polymers pigmented with titanium dioxide and containing a melamine.

A variety of materials have been proposed for stabilizing polymers against deterioration by light. These materials are generally ultraviolet light absorbers and their effectiveness depends upon a number of factors. Thus, the light stability of polymeric compositions depends upon the nature of the polymer, whether it is rigid or plasticized, whether or not it contains a pigment, the type of pigments employed and the ultraviolet light absorber employed in the composition as well as a number of other factors. Although it is generally known that certain ultraviolet light absorbers are more effective than others, it is difficult to predict the effectiveness of a particular ultraviolet light absorber in various polymeric compositions based upon results obtained in a single type of polymeric composition. Thus, for example, ultraviolet light absorbers which have been found effective in plasticized polymers, have been found not to be effective in the corresponding unplasticized or rigid polymer. Furthermore, ultraviolet light absorbers effective in unpigmented compositions may or may not be effective in the same composition which contains a pigment. In certain cases it has been found that ultraviolet light absorbers will actually increase the rate of degradation in polymeric compositions.

It is an object of the present invention to provide light stabilized pigmented polymeric compositions. It is a further object to provide novel light stabilizing compositions. Further objects of the present invention will become evident in view of the following detailed disclosure.

The present invention is based upon the discovery that certain melamines, while themselves not light stabilizers, when combined with polymeric compositions pigmented with titanium dioxide, vastly improved the light stability of the resulting compositions. The particular melamines employed in the present invention are represented by the following general formula.

I.

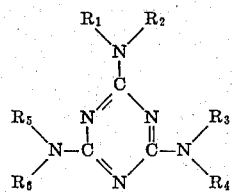

wherein $R_1$, $R_2$, $R_3$, $R_4$, $R_5$ and $R_6$ are individually selected from the group consisting of hydrogen, alkyl of one to 12 carbon atoms, alkenyl of up to 3 carbon atoms, hydroxyalkyl of one to six carbon atoms, monocarbocyclic aryl, and together one pair of R groups on each nitrogen atom can comprise a five or six member hetero-ring such as morpholino, piperidino or the like. Representative melamine compounds falling within this definition are N,N-diallylmelamine, N,N',N"trimethylmelamine, N,N',N"-tri-n-propylmelamine, 2,4-dimethylamino-6-morpholino-s-triazine, 2,4,6-tris-(piperidino)-s-triazine, monoallylmelamine, N,N'-dimethyl-melamine, N,N'N"-triphenylmelamine, N,N-dimethylmelamine, 2,4-bis(dimethylamino)-6-piperidino-s-triazine, hexamethyl-melamine, N,N'-bis(2-hydroxyethyl)-N"-dodecylmelamine, etc.

Pigmented polymers in which these melamines have been found to be effective include rigid and plasticized poly(vinyl chloride), polystyrene, and polyolefins including polyethylene and polypropylene.

The addition of the melamines to the present invention greatly improve the light stability of the resulting polymeric composition. The superior results obtained in accordance with the present invention are most surprising since the melamines alone in unpigmented polymers are ineffective as light stabilizers. While titanium dioxide itself improves the light stability of various polymer compositions to a limited degree, it is unexpected that the addition of the melamine to the pigmented polymeric composition would vastly improve the light stability of the resulting compositions. This is especially surprising in view of the results obtained with widely employed conventional ultraviolet light absorbers which are combined with pigmented polymeric compositions. In many instances the addition of conventional ultraviolet light absorbers actually accelerated degradation of the resulting composition. For example, it has been found that certain 2-hydroxybenzophenones, which are widely employed conventional ultraviolet light absorbers actually increase degradation of pigmented poly(vinyl chloride) composition and only provides a very slight increase in polymer stability of pigmented polystyrene.

While the present invention relates to the compositions set forth above, it is pointed out that poly(vinyl chloride) is normally processed at an elevated temperature during the course of forming into a shaped article. High temperatures tend to discolor the material if a heat stabilizer is not present during the shaping process. If it is desired to prevent the discoloration, a heat stabilizer should be added. If discoloration is not an important problem, the heat stabilizer can be dispensed with. The heat stabilizer which may be used in the poly(vinyl chloride) for the latter to be processible without discoloration due to high temperatures, can be any of the conventionally available types. In fact, commercial poly(vinyl chloride) is currently always processed in the presence of a heat stabilizer of the same types which have been previously used and are useful herein in normal effective amounts. Most heat stabilizers are organo-metallic compounds. However, inorganic compounds such as sodium carbonate are also useful. Among the heat stabilizer organo-metallic compounds are the organo-tin compounds (dibutyl tin dimaleate, dibutyl tin dilaurate, and di-n-butyl tin bis(isooctylmercaptoacetate), the latter being identified commercially as Thermolite"31); cadmium or barium salts (barium stearate, cadmium stearate, barium ricinoleate, cadmium ricinoleate, barium octylphenolate); and the organic hydrochlorophyl (acid acceptor) of the epoxy type (epoxyidized soy beam oil, methyl epoxy stearates). A more complete listing of such heat stabilizers is disclosed in Chevassus et al, The Stabilization of Poly(vinyl chloride), Arnold Pulishers Limited, London (1963), pp. 343-374. It is sometimes desirable to employ in conjunction with the metallic stabilizer, an organic phosphite for the purpose of chelating any metal halide which is formed as a decomposition product of poly(vinly chloride).

The polymeric compositions to be stabilized by the melamines of the present invention contain at least 0.5 percent titanium dioxide based upon the weight of the polymer. The titanium dioxide can be of the rutile or anatase type but preferably is of the rutile type. The particle size range of the pigment is not critical, but a practical particle size range is from 0.05 to 0.4 microns more usually between 0.15 and 0.3 microns. The concentration of titanium dioxide employed in the polymeric composition is dependent upon the degree of opacity and whiteness that is desired in the final product and is less than which will cause chalking or serious weakening of the final product. Generally, the amount of titanium dioxide employed is in the range of 0.5 to about 20.0 weight percent based upon the weight of polymer and preferably above 0.5 weight percent. The amount of melamine employed should be between 0.1 and 10.0 weight percent and preferably between about 0.25 and about 3.0 weight percent based upon the weight of the polymer. The ratio of melamine to $TiO_2$ employed in the final polymeric composition should be between about 0.05 and about 2. The melamine and titanium dioxide can be added to the polymer together or each component can be added separately. After thorough blending by any conventional procedure, the polymeric composition can be shaped into a film or any other article of manufacture by compression molding, extrusion, injection molding, calendering or the like.

Any of the conventional additives normally employed in processing polymeric compositions can be employed to modify compositions of the present invention. Thus, fillers, antistatic agents, dyes, anti-tack agents employed to facilitate molding such as stearic acid, calcium stearate or the like can be added.

The invention is further illustrated by the examples which follow. In the examples, effectiveness of the stabilizer were determined by preparation of polymeric compositions and exposing the resulting compositions to ultraviolet light and other forms of light as exemplified by a Fluorescent Sunlamp-Blacklight Unit and an Atlas Carbon Arc Fade-Ometer. Yellow index measurements were made with the use of a differential colorimeter (Colormaster) and Hunter Color Difference meter. The results are reported as the number of hours to reach a change of yellow index of 15 units ($\Delta YI=15b$).

EXAMPLE 1

Poly(vinyl chloride) samples are prepared from the following formulation:

| | |
|---|---|
| Geon 103 EP [Poly(vinyl chloride)] | 100 parts |
| $TiO_2$ (rutile) | 2.0 parts |
| THERMOLITER 31 | 2.0 parts |
| Stearic Acid | 0.5 parts |

Preblending of 100 gram quantities was accomplished by roll mixing the above formulation overnight. Samples for exposure were prepared by adding a suitable quantity of the additives, as set forth in table I and milling on a two-roll laboratory mill for 5 minutes at 165°C., followed by compression molding at 175°C. to give 50-mil plaques. Results obtained with various light stabilizers are given in the table which follows.

TABLE I

FS-BL Exposure of Various Stabilizers for $TiO_2$ Pigmented PVC

| Additive (1% on weight of polymer) $TiO_2$ at 2.0% on weight of polymer unless otherwise indicated | FS-BL Exposure Data | | Improvement over control (hr.) |
|---|---|---|---|
| | Initial YI* | Time (hr.) for YI=15 | |
| Control (No additive, no $TiO_2$) | 3 | 160 | — |
| $TiO_2$ only | 1 | 490 | 330 |
| 2-hydroxy-4-methoxybenzophenone (0.5%) + $TiO_2$ | 3 | 420 | 260 |
| Hexamethylmelamine | 4 | 200 | 40 |
| 2,4-bis(dimethylamino)-6-morpholino-s-triazine | 3 | 230 | 70 |
| N,N'-dimethylmelamine | 7+ | 180 | 20 |
| 2,4-bis(dimethylamino)-6-(1-pyrrolidino)-s-triazine | 4 | 190 | 30 |
| N,N-diallylmelamine + $TiO_2$ | 3 | 720 | 560 |
| Monoallylmelamine + $TiO_2$ | 5 | 860 | 700 |
| N,N'-bis(2-hydroxyethyl)-N-'-dodecylmelamine + $TiO_2$ | 3 | 920 | 760 |
| N,N',N''-trimethylmelamine + $TiO_2$ | 3 | 830 | 670 |
| Hexamethylmelamine + $TiO_2$ | 2 | 520 | 360 |
| N,N'-dimethylmelamine + $TiO_2$ | 3 | 910 | 750 |
| N,N-dimethylmelamine + $TiO_2$ | 1 | 580 | 420 |
| N,N',N''-triphenylmelamine + $TiO_2$ | 2 | 670 | 510 |
| 2,4,6-tris(piperidino)-s-triazine + $TiO_2$ | 1 | 610 | 450 |
| 2,4-bis(dimethylamino)-6-piperidino-s-triazine + $TiO_2$ | 2 | 690 | 530 |

This example shows the following:

1. Melamines alone do not provide any significant improvement in light stability for the polymeric compositions.
2. Titanium dioxide alone improves the light stability of the polymeric compositions only to a limited extent.
3. The combination of 2-hydroxy-4-methoxybenzophenone which is a commonly employed UV absorber and titanium dioxide is less effective than titanium dioxide alone.
4. Combinations of melamines and titanium dioxide offer significantly greater light stability than is obtained by either component separately.

EXAMPLE 2

Impact polystyrene samples were prepared from the following formulation:

| | |
|---|---|
| Styron 475 (Polystyrene | 100 parts |
| $TiO_2$ (rutile) | 2 parts |

The samples were prepared by incorporating the additives during fusion of the polymer on a two roll mill and were mixed for 3 minutes at 160°C. The samples were compression molded into 50-mil plaques. Results obtained with various light stabilizers are given in table II which follows.

TABLE II

Fade-Ometer Exposure of Various Stabilizer for $TiO_2$ Pigmented Polystyrene

| Additive (0.25% on wt. of polymer unless otherwise indicated) | Fade-Ometer Exposure Data | Improvement |
|---|---|---|

| TiO₂ at 2.0% on wt. on polymer unless otherwise indicated | initial YI* | time (hr.) for YI=15 | over Control |
|---|---|---|---|
| Control (No additive, No TIO₂) | 5 | 100 | — |
| TiO₂ only | 6 | 410 | 310 |
| 2-hydroxy-4-methoxybenzophenone + TiO₂ | 6 | 450 | 350 |
| N,N-diallylmelamine + TiO₂ | 5 | 490 | 390 |
| N,N',N''-tri-n-propylmelamine + TiO₂ | 5 | 500 | 400 |
| 2,4-bis(dimethylamino)-6-morpholino-s-triazine + TiO₂ | 4 | 570 | 470 |
| 2,4,6-tris(piperidino)-s-triazine + TiO₂ | 4 | 530 | 430 |
| Monoallylmelamine + TiO₂ | 6 | 540 | 440 |
| N,N'-dimethylmelamine + TiO₂ | 6 | 520 | 420 |
| N,N',N''-triphenylmelamine + TiO₂ | 4 | 520 | 420 |
| N,N-dimethylmelamine + TiO₂ | 4 | 520 | 420 |
| 2,4-bis(dimethylamine-6-piperidino-s-triazine + TiO₂ | 4 | 500 | 400 |
| Hexamethylmelamine + TiO₂ *** | 4 | 530 | 430 |
| Hexamethylmelamine + TiO₂ **** | 4 | 590 | 490 |
| Hexamethylmelamine + TiO₂ ***** | 4 | 560 | 460 |
| N,N'-bis(2-hydroxyethyl)-N''-dodecylmelamine | 5 | 480 | 380 |

*Hunter Color Difference Meter.
***0.25% melamine.
****0.5% melamine.
*****1.0% melamine.

The results show that the combination of a melamine and TiO₂ pigment provides significantly improved light stability as compared to that obtained with the pigment alone or with the pigment and UV Absorber. The results also show that maximum effect occurs at about 0.5 percent of melamine based on the weight of the polymer.

I claim:

1. A pigmented polymeric composition stabilized against deteriorating effects of ultraviolet light consisting essentially of (a) polystyrene; (b) a pigmenting amount of 0.5 to 20 weight percent on weight of polymer of titanium dioxide and (c) 0.1 to 10 weight percent on weight of polymer of a melamine of the formula:

I.

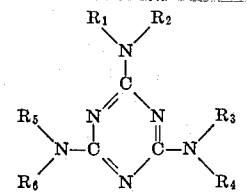

wherein $R_1$, $R_2$, $R_3$, $R_4$, $R_5$, and $R_6$ are individually selected from the group consisting of hydrogen, alkyl of one to 12 carbon atoms, alkenyl of up to three carbon atoms, hydroxylalkyl of one to six carbon atoms, monocarbocyclic aryl, and together one pair of R groups on each nitrogen atom can comprise a five and six member hetero-ring, said titanium dioxide and said melamine together being the sole compounds in said composition capable of imparting light stability to said polymer and wherein the weight ratio of melamine to titanium dioxide is between 0.05 and 2.0.

2. The composition of claim 1 wherein $R_1$, $R_2$, $R_3$, $R_4$, $R_5$, and $R_6$ are selected from the group consisting of hydrogen and alkyl of one to twelve carbon atoms.

* * * * *